S. R. HUNTER.
Harvester Rake.

No. 18,096.

Patented Sept. 1, 1857.

UNITED STATES PATENT OFFICE.

STEPHEN R. HUNTER, OF CORTLAND, NEW YORK.

IMPROVED RAKING DEVICE FOR HARVESTERS.

Specification forming part of Letters Patent No. 18,096, dated September 1, 1857.

*To all whom it may concern:*

Be it known that I, STEPHEN R. HUNTER, of Cortland, in the county of Cortland and State of New York, have invented a new and Improved Raking Device for Harvesters; and I do hereby declare that the following is a full, clear, and exact description of the same, reference being had to the annexed drawings, making a part of this specification, in which—

Figure 1:
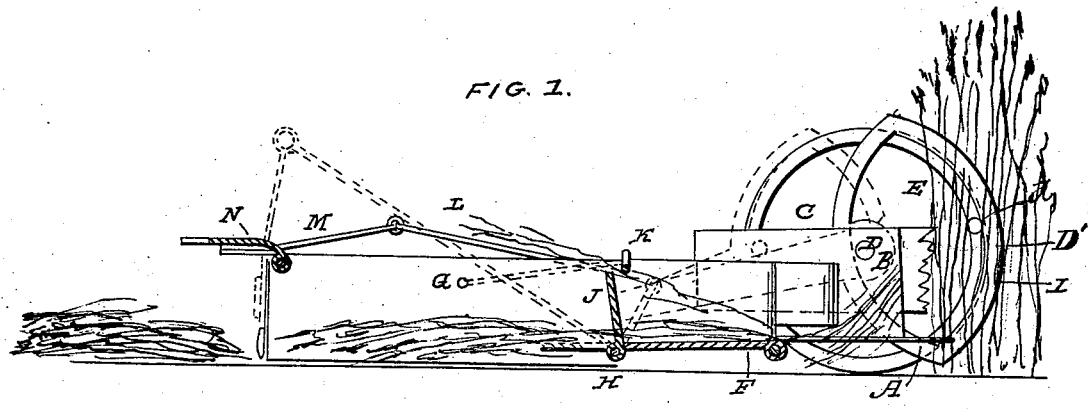
Figure 2:
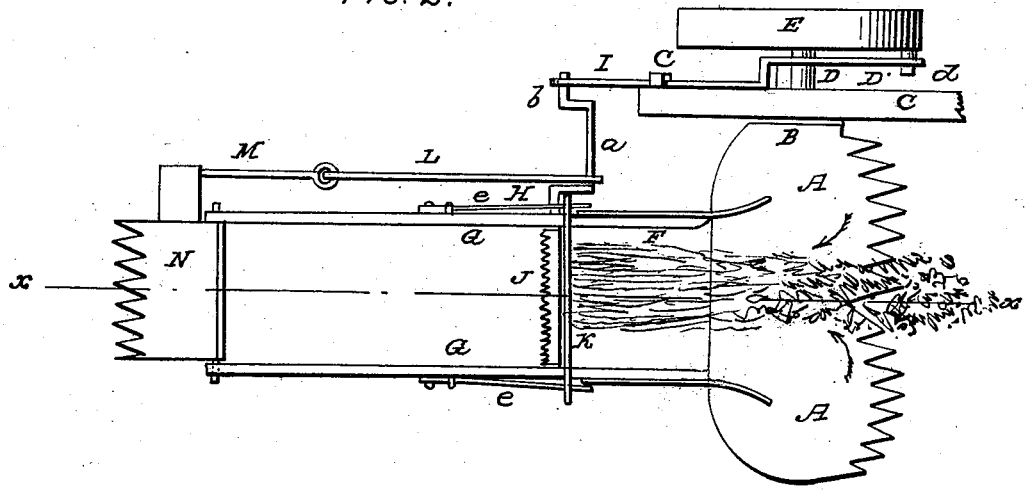

Figure 1 is a longitudinal vertical section of my improvement, taken in the line $x\ x$, Fig. 2. Fig. 2 is a plan or top view of the same.

Similar letters of reference indicate corresponding parts in the two figures.

My invention consists in the employment or use of two gates applied to the machine and arranged and operated as will be hereinafter fully shown and described, whereby the cut grain is deposited upon the ground in sheaves or gavels.

The invention is more especially applicable to a harvester formerly patented by me, and which, owing to its peculiar cutting device, does not strictly require a rake, but a device to cause the grain to be left or deposited in sheaves upon the ground.

To enable those skilled in the art to fully understand and construct my invention, I will proceed to describe it.

A A represent two finger-plates, the front edges on which the fingers are formed being of semicircular shape. The cutter device is precisely similar to that formerly patented by me, and therefore need not be described, as it does not form a part of this invention. The two finger-plates are connected together, and a vertical plate, B, is at one end, to which plate the draft-pole C is attached. A horizontal bar or rod, D, is attached to the upper part of the plate B, and a wheel, E, is placed thereon, said wheel being allowed to turn freely on the rod D.

To the back part of the finger-plates A A a plate, F, is hinged, and to each side of this plate a side piece, G, is attached. These side pieces are parallel with each other and extend some distance back or beyond the plate F.

H is a shaft which passes transversely through the lower parts of the two side pieces G G, and just back of the plate F. This shaft has a double crank, $a\ b$, formed at one end, as shown clearly in Fig. 2. The outermost crank, $b$, has a bar, I, attached to it. This bar passes through guide-loop $c$, attached to the draft-pole C, and an elliptical or oval cam, D', is formed on the outer end of the bar I. The precise form of this cam is shown in Fig. 1.

To the inner side of the wheel E, and near its periphery, a pin, $d$, is attached, said pin working within the cam D'.

To the shaft H a gate, J, is attached, said gate being between the two side pieces G G, and consequently just back of the plate F. The upper edge of the gate J is serrated, and a rod, K, is placed directly over it, the ends of said rod being attached to springs $e\ e$, which are secured to the outer sides of the side pieces, G G.

To the innermost crank, $a$, one end of a rod, L, is attached, the opposite end of said rod being attached to an arm, M, which is secured to one side of a gate, N, placed between the back ends of the side pieces, G G.

From the above description of parts it will be seen that as the machine is drawn along the two gates, N J, will be operated simultaneously and also intermittingly, and, owing to the relative position of the crank $a$ and arm M, one gate will assume a vertical while the other assumes a horizontal position, and vice versa. Suppose the gate J to be in a horizontal position, as shown in red in Fig. 1, the gate N will consequently be in a vertical position, and the cut grain, as the machine moves along, will pass over the plate F into the space between the two side pieces G G, and behind the gate J. When a sufficient quantity has passed behind the gate J said gate will assume a vertical position and cut off the passage of the cut grain, the gate N rising simultaneously and allowing the cut grain to remain in a sheaf or gavel on the ground. The grain, it will be understood, passes butt foremost over the plate F, and the butts rest upon the ground or stubble between the two gates J N, while the heads of the grain rest upon the gate J, which of course is in a horizontal position when the grain is passing over it. The grain is therefore, as the machine is moved along and while the gate J is down, allowed to collect in sufficient quantities between the two gates, as the butts are readily moved along on the stubble by gate N without being tangled up by the forward movement of the machine. As the gate J rises the grain is caught between its serrated edge and the bar K, and thereby retained until the gate J descends or assumes a horizontal position and the gate N a vertical one, when the space between the beams G G is again filled and the operation repeated. It will be seen that the necessary dwells are obtained as the pin $d$ traverses over the curved sides of the cam. The pin actuates the cam as it reaches the angles.

This device is extremely simple and may be applied to the machine at a small cost.

Having thus described my invention, what I claim as new, and desire to secure by Letters Patent, is—

The rod K, or its equivalent, and two gates, J N, applied to the machine as shown, the gates being operated from the wheel E by means of the cam D', crank-shaft H, rod L, and arm M, arranged substantially as shown, for the purpose set forth.

STEPHEN R. HUNTER.

Witnesses:
    P. B. DAVIS,
    RUFUS A. REED.